United States Patent [19]

Chane-Ching et al.

[11] Patent Number: 5,922,330
[45] Date of Patent: *Jul. 13, 1999

[54] HIGH PH COLLOIDAL DISPERSION OF A CERIUM COMPOUND, AND A PROCESS FOR ITS PREPARATION

[75] Inventors: Jean-Yves Chane-Ching, Eaubonne; Thierry Chopin, Saint-Leu la Foret; Jacques Persello, Besancon, all of France

[73] Assignee: Rhone-Poulenc Chimie, Courbevoie Ceedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/527,355

[22] Filed: Sep. 12, 1995

Related U.S. Application Data

[30] Foreign Application Priority Data

Sep. 12, 1994 [FR] France .................................. 9410856

[51] Int. Cl.⁶ .............................. A61K 7/00; B01J 13/00; B01J 23/10; C23F 11/00
[52] U.S. Cl. ...................... 424/401; 106/14.21; 502/304; 516/89
[58] Field of Search ................................. 252/313.1, 314; 423/21.5; 106/14.21; 424/401; 502/304; 516/89

[56] References Cited

U.S. PATENT DOCUMENTS

| | | | |
|---|---|---|---|
| 3,024,199 | 3/1962 | Pasfield | 252/313.1 |
| 4,231,893 | 11/1980 | Woodhead | 252/313.1 |
| 4,356,106 | 10/1982 | Woodhead et al. | 252/313.1 |
| 4,699,732 | 10/1987 | Woodhead | 252/314 |
| 5,021,192 | 6/1991 | David et al. | 252/313.1 |
| 5,132,048 | 7/1992 | Picard-Seon et al. | 252/313.1 |
| 5,376,305 | 12/1994 | Chane-Ching et al. | 252/313.1 |
| 5,449,403 | 9/1995 | Andrean et al. | 424/70 |

FOREIGN PATENT DOCUMENTS

| | | |
|---|---|---|
| 0186313 | 7/1986 | European Pat. Off. . |
| 0206906 | 12/1986 | European Pat. Off. . |
| 0239479 | 9/1987 | European Pat. Off. . |
| 03169205 | 5/1989 | European Pat. Off. . |
| 0335538 | 10/1989 | European Pat. Off. . |
| 2652805 | 4/1991 | France . |
| 4-26528 | 1/1992 | Japan . |
| 4-300644 | 10/1992 | Japan . |

Primary Examiner—Richard D. Lovering
Attorney, Agent, or Firm—Burns, Doane, Swecker & Mathis, L.L.P.

[57] ABSTRACT

In a first embodiment of the invention, a colloidal dispersion of a cerium compound is characterised in that it has a pH of at least 4 and a conductivity of at most 5 mS/cm. In a second embodiment, the colloidal dispersion is characterised in that it has a pH of more than 5. In a third embodiment, the colloidal dispersion is characterised in that the colloids have a carbon content such that the carbon/cerium mole ratio is at Least 0.01 and in that the pH is greater than 5.

A process for the preparation of these dispersions is characterised in that a first colloidal dispersion is used as a starting material, with a pH which is lower than the pH of the dispersion which is to be prepared, and the pH of the first dispersion is raised while reducing the ionic strength. For the third embodiment, an organic acid is added to the starting dispersion.

17 Claims, No Drawings

HIGH PH COLLOIDAL DISPERSION OF A CERIUM COMPOUND, AND A PROCESS FOR ITS PREPARATION

BACKGROUND OF THE INVENTION

1. Field of the Invention

The present invention concerns a high pH colloidal dispersion of a cerium compound and a process for its preparation.

2. Description of the Prior Art

Dispersions of cerium compounds have a number of applications, specifically heterogeneous catalysis, in particular the treatment of exhaust gases from internal combustion engines (automobile post-combustion catalysis). These dispersions can also be used as anticorrosion coatings or in cosmetics.

A number of processes for the preparation of these dispersions have been described. However, known processes can only produce a dispersion with a very acidic pH, i.e., generally less than 5, and with a high concentration of impurities, i.e., ion concentration.

In the applications mentioned above, however, in particular in the cosmetics industry, it is important to be able to produce a colloidal dispersion with a less acidic pH and/or a higher purity.

SUMMARY OF THE INVENTION

The object of the invention is thus to provide a colloidal dispersion with a high pH with, if necessary, a high purity.

In a first embodiment, a colloidal dispersion of a cerium compound in accordance with the invention is characterised in that it has a pH of at least 4 and a conductivity of at most 5 mS/cm.

In a second embodiment, a colloidal dispersion of a cerium compound in accordance with the invention is characterised in that it has a pH of more than 5.

In a third embodiment, a colloidal dispersion of a cerium compound of the invention is characterised in that the colloids have a carbon content such that the carbon/cerium mole ratio is at least 0.01 and in that the pH is greater than 5.

The invention also concerns a process for the preparation of a dispersion in accordance with the first and second embodiments which is characterised in that it is formed from a first colloidal dispersion with a pH which is lower than the pH of the dispersion to be prepared and the pH of the first dispersion is raised while reducing its ionic strength.

Finally, the invention concerns a process for the preparation of a dispersion in accordance with a third embodiment which is characterised in that it is formed from a first colloidal dispersion used as a starting material with a pH which is lower than the pH of the of the dispersion to be prepared, and an organic acid is added to this dispersion and the pH of the first dispersion is then raised while reducing its ionic strength.

Other features, details and advantages of the invention will become apparent from the following description and non limiting examples which illustrate the invention.

DETAILED DESCRIPTION OF THE PREFERRED EMBODIMENTS OF THE INVENTION

In the remainder of the description, the expression "colloidal dispersion of a cerium compound" means any system constituted by fine solid particles with colloidal dimensions which is based on cerium oxide and/or hydrated oxide (hydroxide) in suspension in an aqueous liquid phase, the species also optionally containing trace amounts of bound or adsorbed ions such as nitrates, acetates, citrates or ammonium ions. It should be noted that in these dispersions, the cerium can be either completely in the form of colloids, or both as ions and as colloids.

It should also be noted that the average diameter of the colloids means the average hydrodynamic diameter thereof, as determined by quasi-elastic scattering of light using the method described by Michael L McConnell in Analytical Chemistry 53, no 8, 1007A, (1981).

Further, the term "purity" here refers to the impurities present as ionic species in the dispersion. This purity can be expressed in terms of the conductivity of the dispersion.

Finally, the cerium compound is generally a cerium IV compound.

In the first embodiment of the invention, the colloidal dispersion has both a high pH of at least 4 and high purity, shown by a conductivity of at most 5 mS/cm, preferably at most 2 mS/cm.

The colloidal dispersion of the second embodiment is essentially characterised by a pH of more than 5.

The colloidal dispersion of the third embodiment of the invention is characterised in that the colloids contain a specific proportion of carbon. This proportion is expressed as the carbon/cerium or $CeO_2$ mole ratio. It is at least 0.01. This proportion is generally at most 0.5; in particular, it is between 0.1 and 0.15. The carbon here generally corresponds to carbon located on the colloid surface.

The colloidal dispersions of the second and third embodiments of the invention preferably have a purity which is expressed as a conductivity of at most 5 mS/cm, in particular at most 2 mS/cm.

In each of the three embodiments described above, the pH is preferably at most 6.

Each of these three embodiments has two variations which differ essentially by the colloidal size.

In a first variation, the average diameter of the colloids in the dispersion is between 4 and 20 nm, in particular between 4 and 12 nm.

In the first variation, the concentration of the colloidal dispersion is normally between 10 g/l and 250 g/l, more particularly between 15 g/l and 210 g/l. This concentration is expressed in terms of $CeO_2$.

The conductivity varies as a function of the pH of the colloidal dispersion. In general, the higher the pH, the lower the conductivity. For the first variation, this conductivity is more particularly at most 2 mS/cm. It can be between 0.1 and 1.6 mS/cm.

The pH of the colloidal dispersion is normally between 4, or 5 if necessary, and 7, in particular between 4, or 5 if necessary, and 5.5.

In the second variation, the average colloidal diameter is between 40 and 100 nm, in particular between 40 and 60 nm.

The concentration of the colloidal dispersion is normally between 10 g/l and 1000 g/l, in particular between 10 g/l and 600 g/l, more particularly between 15 g/l and 300 g/l.

The conductivity varies as described above. In the second variation, the conductivity is at most 2 mS/cm, preferably at most 1 mS/cm. More particularly, it is less than 0.3 mS/cm. It can be less than 0.5 mS/cm.

The pH is normally between 4, or 5 if necessary, and 7, more particularly between 4, or 5 it necessary, and 6.5.

The colloidal dispersion of the invention preferably has a monodispersed size distribution.

Finally, in the case of dispersions obtained by processes using cerium nitrate as the starting product, the $NO_3/Ce$ molar ratio is less than 0.7, in particular between 0.01 and 0.7, and more particularly between 0.15 and 0.3.

The processes for the preparation of the colloidal dispersions of the invention will now be described.

These processes all start with a first colloidal dispersion with a pH which is lower than that of the dispersion to be prepared.

The starting colloidal dispersion can be produced using any known means. Particular reference is made to the processes described in European patent applications EP-A-0 206 906, EP-A-0 208 581 and EP-A-0 316 205. In particular, colloidal dispersions can be used which have been produced by thermohydrolysis of an aqueous salt of cerium IV such as a nitrates in particular in acidic medium. Such a process is described in European patent application EP-A-0 239 477 or EP-A-0 208 580. The monodispersed colloidal dispersions of the invention are obtained from starting dispersions which are themselves monodispersed.

When starting from a suspension with a high concentration of $CeO_2$ which thus has a high concentration of impurities and a tendency to settle out, it may be helpful to purify it, for example by washing and decanting the suspension or the starting suspension. The starting suspension is decanted after adding deionised water and removing the supernatant liquid. More water is added to the remaining portion which is taken up again into suspension. This operation can be carried out a number of times one after the other until the required conductivity is obtained.

The process for the preparation of the colloidal dispersions of the first two embodiments essentially consists of raising the pH of the starting dispersion while reducing the ionic strength.

Several processes can be used.

Firstly, dialysis can be used.

In the case of dialysis treatment, a dialysis membrane is used which is resistant to the pH of the dispersion or suspension and which has a cutoff diameter such that it is impermeable to colloids. It can, for example, be a cellulose membrane with a thin wall and a cutoff diameter corresponding to a molecular weight of between 12000 to 14000 daltons.

Ultrafiltration can also be used. In this case, ultrafiltration is alternated with dilution of the ultrafiltered suspension using deionised water.

Electrodialysis and dilution can also be used. In this case, the colloidal dispersion is circulated and diluted in the central compartment of an electrolysis cell provided with anode and cathode compartments separated by the membranes of the central compartment.

In a preferred process, anionic and cationic ion exchange resins are used.

Preferably, highly acidic cationic resins and highly basic anionic resins are used.

Cationic and anionic exchange resins are well known. Examples are cationic resins containing a polystyrene backbone. In particular, those with sulphonate or $H^+$ functional groups can be used. Examples of suitable cationic resins are Amberlite IR $120^R$ or Amberlite IRN $77^R$ Examples are anionic resins containing a styrene-divinylbenzene copolymeric backbone. In particular, resins with quaternary ammonium or $OH^-$ functional groups can be used. Examples of suitable anionic resins are Amberlite IRN $78^R$ or Duolite A $101^R$.

It is necessary to use two types of resin. They can be used simultaneously. They can also be used in alternating fashion if the anionic resin, which is alone the cause of the rise in pH, does not produce a very high increment in pH.

The resin treatment can be carried out in any suitable fashion. The resins can be brought into direct contact with the colloidal dispersion. A preferred method consists of placing the resins in bags formed from dialysis membranes of the type described above and introducing these bags into the dispersion to be treated.

The ratio of the mass of cationic resin to the mass of anionic resin can be between 0.1 and 1. The quantity of anionic resin is defined by the pH to be obtained. The kinetics regarding the resin treatment can be defined by the time required to obtain a unit increment in pH. Thus the resins can be added so as to obtain a unit increment in pH in 5 to 7000 minutes.

The process for the preparation of the colloidal dispersion of the third embodiment of the invention includes an additional feature.

This feature consists of adding an organic acid to the first starting dispersion.

This organic acid is preferably selected from the group formed by acids which are soluble in water and have a $pK_a$ of between 2.5 and 5.0. It is an aliphatic acid in particular, more particularly a saturated aliphatic acid. Examples are formic, acetic, propionic, butyric, valeric, citric and malonic acids.

The quantity of acid added is normally between 0.1 and 20 mole % of acid with respect to $CeO_2$.

The next part of the process is identical to that described for the preparation of the colloidal dispersions of the first two embodiments, i.e., simultaneously with or posterior to the acid addition, the ionic strength of the dispersion is reduced.

A supplementary subsequent step can be added to produce more concentrated colloidal dispersions.

Concentration can be effected by evaporation, osmotic compression or ultrafiltration.

The principle of osmotic compression is the equilibration of the chemical potential of water across a membrane.

This is effected by placing the colloidal dispersion in a dialysis bag, for example of cellulose material; the bag being placed in an aqueous solution with a chemical potential of water which is different to that of the aqueous phase of the dispersion. This can be effected, for example, using an aqueous solution of polyethylene glycol (PEG) and $NaNO_3$. The concentration of PEG fixes the osmotic pressure and thus the final concentration of the colloidal dispersion of the cerium compound.

Ultrafiltration can be carried out at this stage in the manner described above.

All the steps of the processes described above are preferably carried out at room temperature.

The colloidal dispersions of the invention as described above or obtained using processes which are to be described can be employed in a number of applications. Examples are automobile post-combustion catalysis, lubrication and ceramics. They can in particular be used in cosmetic compositions, in particular in the preparation of UV screening creams. They can also be used on a substrate as an anticorrosion agent.

The colloidal dispersions of the invention are particularly suitable for the treatment of metallic substrates, in particular steel substrates containing chrome and/or aluminium or alloy substrates containing chrome and/or aluminium.

Examples are martensitic, ferric and austenitic stainless steels; the latter type can be stabilised with titanium or niobium. Further examples are refractory steels or alloys such as Fe—Cr—Al, Ni—Cr—Al—Y, Co—Cr—Al—Y or Fe—Al or Ni—Al alloys.

The substrate needs no particular pretreatment prior to the treatment apart from conventional degreasing and cleaning. The substrates may or may not be pre-oxidised.

The dispersion can be directly deposited on the substrate from the suspension of the invention using conventional coating techniques such as dipping or spraying.

Following deposition, the substrate has a layer adhering to the surface, and it can be handled.

The substrate must then be heat treated, to remove water in particular.

Heat treatment is usually carried out at a temperature of at most 600° C. This temperature may be lower, for example at most 400° C., depending on the nature of the substrates.

Examples will now be given. In the examples, the conductivity was measured using a CDM 83 (Radiometer Copenhaugen) conductimeter with a CDC 304 measuring cell.

EXAMPLE 1

200 cc of an aqueous colloidal dispersion, obtained by adding water to a dispersable cerium 4+ compound synthesized as described in patent EP-A-0 208 580, was placed in a Pyrex$^R$ flask.

The colloid diameter was 5 nm and the cerium 4+ concentration, expressed as $CeO_2$, was 172 g/l. The conductivity was 57 mS/cm and the pH was 1.1. A sealed dialysis bag of cellulose material (cutoff diameter of MW 13000 to 15000) containing 18 g of RH cationic resin (Amberlite IRN 77) and a dialysis bag containing 20 g of ROH anionic resin (Amberlite IRN 78) were simultaneously immersed in the colloidal sol. The colloidal sol was then kept at room temperature in the presence of the resins in the stoppered Pyrex flask.

The replenishing conditions for the resins and the evolution of pH and conductivity of the colloidal sol are shown in the following table:

TABLE 1

| Time | pH before introduction of resins | Conductivity before introduction of resins | Mass of RH resin introduced | Mass of ROH resin introduced |
|---|---|---|---|---|
| 0 | 1.1 | 57 mS/cm | 18 g | 20 g |
| 3 days | 1.32 | 34.6 mS/cm | 17 g | 18 g |
| 6 days | 1.68 | 16.9 mS/cm | 18 g | 17.5 g |
| 8 days | 2.69 | 2.14 mS/cm | 17 g | 17 g |
| 10 days | 3.3 | 1.82 mS/cm | 17 g | 17 g |
| 13 days | 3.93 | 1.62 mS/cm | 19 g | 18 g |
| 15 days | 3.97 | 1.58 mS/cm | 17.5 g | 17.5 g |
| 17 days | 4.04 | 1.57 mS/cm | 17.5 g | 18 g |
| 20 days | | | 16.5 g | 16.5 g |
| 22 days | 4.54 | | 17.5 g | 18.2 g |
| 24 days | 5.4 | 1.54 mS/cm | 0 | 0 |

The concentration of $CeO_2$, determined by oven drying an aliquot of colloidal sol and calcining at 1000° C., was 138 g/l. The colloidal sol obtained was stable as regards settling and gel formation for at least 6 months. The colloids had an average diameter of 5 nm.

EXAMPLE 2

400 cc of deionised water was added to 500 grams of a dispersable cerium 4+ compound obtained by thermohydrolysis of a ceric nitrate solution ($CeO_2$=60 g/l and r=OH/$Ce^{4+}$=2) as described in patent EP-A-0 208 580.

A first purification phase was effected on the dispersion by decanting and removing the supernatant liquid. After homogenisation of the dispersion previously obtained by stirring, the precipitate was allowed to settle out overnight and the supernatant liquid was removed. A further 300 cc of deionised water was added and the dispersion was homogenised by stirring. This was again allowed to settle out overnight and the supernatant liquid was removed. 150 cc of deionised water was added and after homogenisation, the major portion of the cerium 4+ compound was in the colloidal form. After elimination of the small non dispersed portion, a colloidal sol was recovered which had a $CeO_2$ concentration of about 510 g/l of $CeO_2$ was recovered.

1 litre of this colloidal sol was added to 172 g/l of $CeO_2$ in a Pyrex flask. The colloidal diameter was 5 nm. The pH was 1.56 and the conductivity was 21.1 mS/cm.

Four sealed cellulose material dialysis bags (cutoff diameter MW 13000 to 15000) each containing about 15 g of RH cationic resin (Amberlite IRN 77) and four identical dialysis bags each containing about 15 g of ROH anionic resin (Amberlite IRN 78) were simultaneously immersed in the colloidal sol. The colloidal sol was then kept at room temperature in the presence of the resins in the stoppered Pyrex flask.

The replenishing conditions and the evolution of the pH and conductivity of the colloidal sol are shown in the following table:

TABLE 2

| Time | pH before introduction of resins | Conductivity before introduction of resins | Mass of RH resin introduced | Mass of ROH resin introduced |
|---|---|---|---|---|
| 0 | 1.56 | 21.1 mS/cm | 4 × 15 g | 4 × 15 g |
| 2 days | 1.76 | 9.7 mS/cm | 4 × 15 g | 4 × 15 g |
| 8 days | 2.8 | 2.3 mS/cm | 4 × 15 g | 4 × 15 g |
| 10 days | 3.7 | 1.7 mS/cm | 4 × 15 g | 4 × 15 g |
| 13 days | 3.86 | 1.64 mS/cm | 4 × 15 g | 4 × 15 g |
| 15 days | 3.9 | | 4 × 15 g | 4 × 15 g |
| 17 days | 4.11 | 1.62 mS/cm | 4 × 15 g | 4 × 15 g |
| 20 days | 4.22 | 1.5 mS/cm | 4 × 15 g | 4 × 15 g |
| 22 days | 4.61 | 1.38 mS/cm | 0 | 0 |

The colloidal sol was concentrated by osmotic compression as follows.

The colloidal sol was poured into the cellulose membrane described above and closed at its lower end.

The assembly was equilibrated in a solution of 0.005 M $NaNO_3$ at a pH of 4.61, for 7 days.

The cellulose membrane/colloidal sol assembly was then immersed in an aqueous solution with the following composition:

5% by weight of polyethylene glycol PEG with a molecular weight of 35000, 5.10–3 $NaNO_3$, and pH=4.61 ($HNO_3$).

The colloidal sol was recovered after 3 days.

The concentration of the colloidal sol was 178 g/1000 g of dispersion, equivalent to 210 g/l of $CeO_2$.

The average colloidal size was 5 nm.

EXAMPLE 3

Three sealed cellulose dialysis bags (cutoff diameter 13000 to 15000) each containing about 20 g of RH cationic resin (Amberlite IRN 77) and three identical dialysis bags each containing about 20 g of ROH anionic resin (Amberlite IRN 78) were simultaneously immersed in 500 cc of a colloidal sol with a colloidal diameter of 50 nm, which had been concentrated to 705 g/l of $CeO_2$ using the technique described in Example 2, with a pH of 1.04 and a conductivity of 43.9 mS/cm. The colloidal sol was kept at room temperature in a stoppered Pyrex flask in the presence of the resins.

The replenishing conditions and the evolution of the pH and conductivity of the colloidal sol are shown in the following table:

TABLE 3

| Time | pH before introduction of resins | Conductivity before introduction of resins | Mass of RH resin introduced | Mass of ROH resin introduced |
|---|---|---|---|---|
| 0 | 1.04 | 43.9 mS/cm | 3 × 20 g | 3 × 20 g |
| 5 days | 1.2 | 19.8 mS/cm | 3 × 20 g | 3 × 20 g |
| 7 days | 1.9 | 6.11 mS/cm | 3 × 20 g | 3 × 20 g |
| 10 days | 2.46 | 2.56 mS/cm | 3 × 20 g | 3 × 20 g |
| 12 days | 2.54 | 2.14 mS/cm | 3 × 20 g | 3 × 20 g |
| 14 days | 2.86 | 1.68 mS/cm | 3 × 20 g | 3 × 20 g |
| 17 days | 3.07 | 1.56 mS/cm | 3 × 20 g | 3 × 20 g |
| 19 days | 3.24 | 1.24 mS/cm | 3 × 30 g | 3 × 30 g |
| 21 days | 3.40 | 1.19 mS/cm | 3 × 30 g | 3 × 30 g |
| 25 days | 3.51 | 1.00 mS/cm | 3 × 30 g | 3 × 30 g |
| 31 days | 3.52 | 0.92 mS/cm | 3 × 30 g | 3 × 30 g |
| 35 days | 3.75 | 0.84 mS/cm | 3 × 30 g | 3 × 30 g |
| 38 days | 4.01 | 0.80 mS/cm | 0 | 0 |

The colloidal sol was concentrated by osmotic compression as follows.

The colloidal sol was poured into the cellulose membrane described above and closed at its lower end.

The assembly was equilibrated in a solution of 0.0075 M $NaNO_3$ at a pH of 4, for 7 days.

The cellulose membrane/colloidal sol assembly was then immersed in an aqueous solution with the following composition:

5% PEG, M W 35000, 0.0075 M $NaNO_3$, and pH=4.

The colloidal sol was recovered after 2 days.

The concentration of the colloidal sol, determined after drying and calcining an aliquot of the colloidal sol, was 518 g of $CeO_2$/1000 g of dispersion, equivalent to a concentration of 935 g/l of $CeO_2$.

The average colloidal size was 50 nm.

EXAMPLE 4

200 cc of a colloidal sol of $CeO_2$ containing 81 g/l of $CeO_2$ was introduced into a beaker. The colloidal diameter was 50 nm. The pH of the colloidal sol was 1. The ionic conductivity was 32 mS/cm. 1.2 g of commercial concentrated acetic acid (Prolabo), i.e., an acetic acid/$CeO_2$ molar ratio of about 20%, and 20 cc of a cationic resin (Amberlite IRN 77) pretreated with a 1 N HCl solution and washed with deionised water to a pH of 6, were incorporated into the colloidal sol with stirring. After 12 minutes, 10 cc of anionic resin (Amberlite 78) treated with 1 M NaOH and washed with water to a pH of 6, was introduced. The cycle was repeated until a pH of 6.5 was obtained. After separation of the resin by decanting, the colloidal sol had an ionic conductivity of 48 $\mu$S/cm. The colloidal diameter was 50 nm. The solution exhibited perfect long term stability. The concentration of nitrate, expressed as $NO_3/CeO_2$, was 0.66% by weight. Carbon determination indicated a percentage of 0.97% of $C/CeO_2$. The $CeO_2$ concentration was 60 g/l.

EXAMPLE 5

Example 4 was repeated, replacing the acetic acid by citric acid. 1.2 g of solid citric acid dissolved in 10 cc of water was introduced into the colloidal sol after 1 h 20, with stirring. The citric acid/$CeO_2$ ratio was 2 mole %.

The cationic/anionic resin was added as described in Example 4, until the pH was 6. After separating the resin by decanting, the colloidal sol had a $CeO_2$ concentration of the order of 60 g/l. The solution exhibited perfect long term stability.

EXAMPLE 6

200 cc of a colloidal $CeO_2$ solution containing 141 g/l of $CeO_2$ was introduced into a 1 litre beaker. 100 cc of water was added with stirring. The pH was 1.1 and the conductivity was 29.9 mS/cm. Quasi-elastic light scattering measurements indicated particles of about 5 nm.

50 cc of cationic resin (Amberlite IR 120) pretreated with hydrochloric acid was added. At t=8 minutes, a further 50 cc of cationic resin was added. At t=16 minutes, an additional 50 cc of cationic resin was added. At t=24 minutes, a further 50 cc of cationic resin was added. After stopping stirring at t=32 minutes, the resins were eliminated from the reaction medium by decanting. The recovered colloidal sol was then treated in the following cycle: 25 cc of anionic resin (Duolite A 101, treated with NaOH) and 8 minutes later, 25 cc of cationic resin. This cycle was repeated until a pH of 7 was obtained.

After stopping stirring and decanting, the resins were eliminated. The recovered colloidal sol contained 30 g/l of $CeO_2$. Quasi-elastic light scattering measurements indicated an average diameter of 50 nm, indicating agglomeration of the primary colloids. The ionic conductivity was 152 $\mu$S/cm. The solution exhibited long term stability to settling and gel formation.

An aliquot underwent ultracentrifuging and the colloids were recovered by decanting. Determination of the $NO_3$ in the colloids gave a $NO_3/CeO_2$ concentration of the order of 0.3% by weight.

We claim:

1. An aqueous colloidal dispersion of a cerium compound, consisting essentially of a cerium IV oxide and/or a hydrated oxide, the colloidal dispersion having a pH of greater than 5 and a conductivity of at most 2 mS/cm and being formed from a cerium nitrate starting product.

2. The dispersion according to claim 1, wherein the average diameter of the colloids is between 40 and 90 nm.

3. The dispersion according to claim 2, wherein the dispersion has a conductivity of at most 1 mS/cm.

4. The dispersion according to claim 2, wherein the dispersion has a conductivity of at most 0.3 mS/cm.

5. An aqueous colloidal dispersion consisting essentially of a cerium IV compound, wherein the dispersion has a pH of greater than 5 and the conductivity is at most 2 mS/cm.

6. The dispersion according to claim 1 or claim 5 wherein the average diameter of the colloids is between 4 and 20 nm.

7. The dispersion according to claim 1 or claim 5 wherein the dispersion has a pH of at least 6.

8. A process for the preparation of the dispersion according to claim 1 or claim 5, wherein a first colloidal dispersion is used as a starting material with a pH which is lower than the pH of the dispersion to be prepared and the pH of the first dispersion is raised while reducing the ionic strength thereof.

9. The process according to claim 8, wherein the pH is raised and the ionic strength is reduced in the first dispersion by treating the first dispersion with a cationic resin and with an anionic resin.

10. The process according to claim 8, wherein the pH is raised and the ionic strength is reduced by treating the first dispersion by dialysis, electrodialysis or ultrafiltration.

11. The process according to claim 8, further comprising a step of concentration of the dispersion.

12. The process according to claim 8, wherein the dispersion is concentrated by evaporation, osmotic compression or ultrafiltration.

13. A method of using a dispersion obtained using the process according to claim 8, by depositing it as an anti-corrosive agent on a substrate.

14. A method of using a dispersion obtained using the process according to claim 8, by incorporating in a cosmetic composition.

15. A method of using a dispersion according to claim 1, by depositing it as an anti-corrosive agent on a substrate.

16. A method of using a dispersion according to claim 1, by incorporating it in a cosmetic composition.

17. A method of using a dispersion according to claim 1, by incorporating it in an automobile post-combustion catalyst, a lubricat or a ceramic.

* * * * *